United States Patent
Carter, Jr. et al.

(10) Patent No.: US 9,611,958 B1
(45) Date of Patent: Apr. 4, 2017

(54) COMBINATION MECHANICAL/FUSION PIPE FITTING WITH PUSH CONNECT COUPLING ARRANGEMENT

(75) Inventors: Robert V. Carter, Jr., Erie, PA (US); James Stafford, Erie, PA (US); Jeffrey Exley, Waterford, PA (US)

(73) Assignee: Zurn Industries, LLC, Milwaukee, WI (US)

( * ) Notice: Subject to any disclaimer, the term of this patent is extended or adjusted under 35 U.S.C. 154(b) by 815 days.

(21) Appl. No.: 11/969,360

(22) Filed: Jan. 4, 2008

Related U.S. Application Data

(60) Provisional application No. 60/878,891, filed on Jan. 5, 2007.

(51) Int. Cl.
*F16L 19/08* (2006.01)
*F16L 37/091* (2006.01)

(52) U.S. Cl.
CPC ............ *F16L 19/08* (2013.01); *F16L 37/091* (2013.01)

(58) Field of Classification Search
CPC ............................... F16L 19/08; F16L 37/091
USPC ................. 285/21.1, 21.2, 340, 104, 105
See application file for complete search history.

(56) References Cited

U.S. PATENT DOCUMENTS

| | | | |
|---|---|---|---|
| 1,440,207 A | 12/1922 | Burns | |
| 1,711,995 A | 5/1929 | Erickson | |
| 2,458,874 A | 1/1949 | Parker | |
| 2,475,741 A | 7/1949 | Goeller | |
| 2,484,192 A * | 10/1949 | Squiller | 285/340 |
| 2,490,620 A | 12/1949 | Cole et al. | |
| 2,565,636 A | 8/1951 | Tinnerman | |
| 2,693,377 A | 11/1954 | Wurzburger | |
| 2,950,132 A | 8/1960 | Kocsuta | |
| 3,204,988 A * | 9/1965 | Dunton et al. | 285/40 |
| 3,217,400 A | 11/1965 | Illesy et al. | |
| 3,249,373 A | 5/1966 | Goldstein | |
| 3,251,613 A | 5/1966 | Tatsch | |
| 3,315,970 A * | 4/1967 | Holoway | 277/615 |
| 3,401,959 A | 9/1968 | Reiss et al. | |
| 3,591,208 A | 7/1971 | Nicolaus | |
| 3,860,273 A | 1/1975 | Petrus | |

(Continued)

FOREIGN PATENT DOCUMENTS

| | | |
|---|---|---|
| DE | 33 22 202 A1 | 1/1984 |
| EP | 0 829 671 A2 | 3/1998 |

(Continued)

*Primary Examiner* — Daniel P Stodola
*Assistant Examiner* — Zachary Dragicevich
(74) *Attorney, Agent, or Firm* — Quarles & Brady LLP

(57) ABSTRACT

A pipe coupling system includes first and second polymeric, thermoplastic pipes secured to each other by a pipe coupling. The pipe coupling includes a mechanical sealing surface adapted to receive a mechanical seal, a fusion seal, or both. The pipe coupling includes a pipe coupling body with an outer surface and a first end and an oppositely positioned second end. First and second respective threads are respectively defined about the first and second ends. A nut is used in the pipe coupling system when the mechanical seal is used to join the pipe first ends to seal against the coupling inner surface. A mechanical capture ring is also included, which defines a central aperture having inwardly angled engagement prongs that are sized to capture the respective first ends of the pipe. The engagement prongs are configured to each include a sloping face.

11 Claims, 15 Drawing Sheets

(56) References Cited

U.S. PATENT DOCUMENTS

| | | | |
|---|---|---|---|
| 4,083,587 A | 4/1978 | Leczycki | |
| 4,111,464 A | 9/1978 | Asano et al. | |
| 4,523,780 A | 6/1985 | Cheer | |
| 4,583,772 A | 4/1986 | Vassallo et al. | |
| 4,629,220 A | 12/1986 | Crusco | |
| 4,632,437 A | 12/1986 | Robson et al. | |
| 4,635,975 A | 1/1987 | Campbell | |
| 4,676,533 A | 6/1987 | Gerondale | |
| 4,749,214 A | 6/1988 | Hoshkins et al. | |
| 4,779,902 A | 10/1988 | Lee | |
| 4,865,674 A | 9/1989 | Durkin | |
| 4,875,714 A | 10/1989 | Lee | |
| 4,911,406 A | 3/1990 | Attwood | |
| 5,018,555 A | 5/1991 | Hawerkamp | |
| 5,028,080 A | 7/1991 | Dennany, Jr. | |
| 5,051,015 A | 9/1991 | Moeck | |
| 5,160,179 A | 11/1992 | Takagi | |
| 5,297,819 A | 3/1994 | Harder | |
| 5,360,240 A | 11/1994 | Mott | |
| 5,360,242 A | 11/1994 | Argent | |
| 5,361,283 A | 11/1994 | Attix | |
| 5,367,548 A | 11/1994 | Attix | |
| 5,398,974 A * | 3/1995 | Mizukawa et al. | 285/21.2 |
| 5,527,073 A | 6/1996 | Readman | |
| 5,580,099 A | 12/1996 | Eaton | |
| 5,588,685 A | 12/1996 | Folkers | |
| 5,662,360 A | 9/1997 | Guzowski | |
| 5,681,062 A | 10/1997 | Fukao et al. | |
| 5,695,224 A | 12/1997 | Grenier | |
| 5,738,388 A | 4/1998 | Sundelin | |
| 5,816,627 A | 10/1998 | Readman | |
| 5,921,588 A | 7/1999 | Vogel et al. | |
| 5,921,591 A | 7/1999 | Argent | |
| 5,927,762 A | 7/1999 | Webb | |
| 5,934,713 A | 8/1999 | Guest | |
| 5,988,702 A | 11/1999 | Sas-Jaworsky | |
| RE36,630 E * | 3/2000 | Davey | 285/39 |
| 6,109,664 A | 8/2000 | Guest | |
| 6,168,574 B1 | 1/2001 | VanDemark | |
| 6,250,686 B1 * | 6/2001 | Becker et al. | 285/21.2 |
| 6,299,176 B1 | 10/2001 | Guzowski et al. | |
| 6,378,915 B1 | 4/2002 | Katz | |
| 6,409,221 B1 | 6/2002 | Robinson et al. | |
| 6,450,549 B1 | 9/2002 | Schutz | |
| 6,450,550 B1 | 9/2002 | Cornwell | |
| 6,464,266 B1 | 10/2002 | O'Neill et al. | |
| 6,464,267 B1 | 10/2002 | Egozi | |
| 6,505,860 B2 | 1/2003 | Trichard | |
| 6,520,547 B2 | 2/2003 | Robinson | |
| 6,719,330 B2 | 4/2004 | Brown et al. | |
| 6,860,523 B2 | 3/2005 | O'Neill et al. | |
| 6,913,292 B2 | 7/2005 | Snyder, Sr. et al. | |
| 6,916,050 B2 | 7/2005 | Milhas | |
| 7,255,373 B2 | 8/2007 | Pridham | |
| 7,270,351 B2 | 9/2007 | Chelchowski et al. | |
| 7,500,697 B2 | 3/2009 | Romack | |
| 7,523,966 B2 | 4/2009 | O'Neill et al. | |
| 7,530,606 B1 | 5/2009 | Yang | |
| 7,549,679 B2 | 6/2009 | Brosius et al. | |
| 2002/0163193 A1 | 11/2002 | Abuellel | |
| 2002/0185868 A1 | 12/2002 | Synder, Sr. et al. | |
| 2003/0067170 A1 | 4/2003 | Synder, Sr. et al. | |
| 2004/0070270 A1 | 4/2004 | Gunji | |
| 2004/0155464 A1 | 8/2004 | Slattsveen | |
| 2004/0245778 A1 | 12/2004 | Adams | |
| 2005/0040650 A1 | 2/2005 | Chang | |
| 2005/0134042 A1 | 6/2005 | Kikumori et al. | |
| 2005/0146133 A1 | 7/2005 | Snyder, Sr. et al. | |
| 2007/0114793 A1 | 5/2007 | Kanai et al. | |

FOREIGN PATENT DOCUMENTS

| | | | |
|---|---|---|---|
| EP | 1 006 307 A1 | 6/2000 | |
| EP | 1 308 662 A2 | 5/2003 | |
| FR | 2 804 196 A1 | 7/2001 | |
| WO | WO 94/25786 * | 11/1994 | F16L 37/084 |
| WO | 00/52365 A1 | 9/2000 | |
| WO | 02/070940 A1 | 9/2002 | |
| WO | 2004/113777 A2 | 12/2004 | |
| WO | 2007004860 A1 | 1/2007 | |
| WO | 2007004861 A1 | 1/2007 | |
| WO | 2007004862 A1 | 1/2007 | |
| WO | 2007004880 A2 | 1/2007 | |

* cited by examiner

US 9,611,958 B1

COMBINATION MECHANICAL/FUSION PIPE FITTING WITH PUSH CONNECT COUPLING ARRANGEMENT

CROSS REFERENCE TO RELATED APPLICATIONS

This application claims benefit of U.S. Provisional Patent Application No. 60/878,891 entitled "Improved Combination Mechanical/Fusion Pipe Fitting with Push Connect Coupling Arrangement" filed Jan. 5, 2007, which is hereby incorporated by reference in its entirety.

BACKGROUND OF THE INVENTION

Field of the Invention

The present invention is related, in general, to coupling of multiple pipes and, more particularly, to a push connect coupling arrangement.

Description of Related Art

Prior to the advent of plastic pipe, most piping was made out of metal, such as copper, stainless steel, or iron. The particular metal used for the piping was dependent upon the application. For example, water could be transported through copper and/or cast iron pipes. However, acidic and basic fluids had to be transported in stainless steel pipe. Some forms of metal pipes, such as copper and stainless steel, are expensive to manufacture and install. Most often, the metal pipes are either brazed or welded together. In some instances, mechanical type joints were provided for pipe connections, which include compression type fittings. In today's market, all of these arrangements are expensive to manufacture and install.

Plastic pipe overcomes many of the expenses associated with metal pipe. Plastic pipe is inexpensive to manufacture and relatively easy and inexpensive to connect together. In the case of polymeric and thermoplastic pipe materials, such as polypropylene, the pipe can be welded or fused together by providing a polypropylene sleeve with electrical heating elements embedded therein. This process is known as fusion welding. Fusion welded pipe is particularly well-suited for applications where caustic and corrosive fluids are passed through the plastic pipe. Polypropylene pipes can be joined together with mechanical seals and joint couplings as well as by fusion welding joints and couplings. In some applications, mechanical seals and joints are preferable to the fusion welding joints. In other applications, both fusion welding and mechanical seals are combined for added strength, such as those disclosed in U.S. Pat. Nos. 6,250,686; 6,450,544; and 6,680,464, which are hereby incorporated by reference.

In the past, one type of pipe joint coupling was required for fusion sealing and welding, while a different joint coupling was needed for mechanically sealed joints. This resulted in an increase in inventory required by the installer, such as the mechanical contractor or plumber, since two separate types of couplings were required, one for mechanical sealing and the other for fusion welding. Additionally, assembly and final joint preparation needed improvement in that most often, two or more individuals were needed to fabricate any of the sealed joints: one to restrain the ends of the pipes and or coupling to be joined together, and another person to weld or mechanically seal the joint.

SUMMARY OF THE INVENTION

The improved pipe coupling system of the invention typically includes first and second polymeric, thermoplastic, and desirably polypropylene pipes secured to each other by a pipe coupling or pipe fitting of the same or a similar material. The first and second thermoplastic pipes are most often cylindrical and formed with respective first ends and outer surfaces, and have respective passageways defined by the inner surfaces. The pipe coupling also includes an inner surface defining a pipe coupling passageway, and the respective passageways are placed in fluid communication.

The pipe coupling includes a mechanical sealing surface adapted to receive a mechanical seal, a fusion seal, or both. The pipe coupling includes a pipe coupling body with an outer surface and a first end and an oppositely positioned second end. An annular lip is defined about the inner surface midway between the first and second ends thereof. First and second respective threads are respectively defined about the first and second ends.

A nut, which may be of a similar polymeric material, is used in the pipe coupling system when the mechanical seal is used to join the pipe first ends to seal against the coupling inner surface. Also, a combination of the nut, the mechanical seal, and the fusion seal may be used in various combinations. The nut coacts with the first and or second set of threads of the pipe coupling to create the joint.

To establish the capability for single individual assembly, various assembly capture joint components are disclosed herein, which make it easier to assemble the pipe to the pipe coupling. The assembly capture joint components can include new mechanical and fusion seals with capture and sealing features and new capture rings that can be used alone or in combination.

More specifically, the present invention is directed to a piping system incorporating a mechanical seal. The piping system includes a first pipe made of thermoplastic material having a first pipe first end and a conduit having a body. The body having a conduit first end, an outer surface and an inner surface. The inner surface defines a passageway, and a first receiving profile. The first pipe first end is received by the conduit first end. The first receiving profile is positioned coaxially with the first pipe. The system also includes a mechanical seal for securing the first pipe to the conduit that is positioned within the first receiving profile, and a capture ring seated in the conduit first end and adapted to receive and retain the first pipe end during assembly. The capture ring defines a central aperture and includes a circular body with a plurality of prongs extending therefrom.

The plurality of prongs of the capture ring may be equally spaced around a circumference of the circular body and each of the plurality of prongs may include a sloping face. The capture ring may further include a plurality of teeth extending from the circular body. The plurality of teeth and the plurality of prongs may be configured to extend from the circular body in opposite directions.

The mechanical seal may include a body having a tapered portion with an inner surface and a substantially cylindrical portion extending from the tapered portion; a plurality of sealing rings formed on the inner surface of the tapered portion; and at least one stepped ring projecting interiorly from the tapered portion to establish a sealing ledge. Alternatively, the mechanical seal may include a body having a tapered portion with an inner surface and a substantially cylindrical portion extending from the tapered portion; and a sealing ring formed on the inner surface of the tapered portion.

The present invention is also directed to a kit for joining thermoplastic pipe together. The kit includes a pipe conduit, a mechanical seal, a nut and a capture ring. The pipe conduit includes a thermoplastic body. The body has a first end and a second end, an outer surface defining threads and an inner surface. The inner surface defines a passageway. A first inner tapered surface is adjacent the pipe conduit first end. The mechanical seal includes a flexible mechanical seal body having a tapered portion adapted to coact with the first inner tapered surface. The mechanical seal flexible body has an inner surface configured to sealingly receive a thermoplastic pipe. The nut has a body with threads configured to be threadably received by the pipe conduit and adapted to contact the tapered portion of the flexible mechanical seal body when the flexible mechanical seal body is received by the pipe conduit. The capture ring has a circular body with a plurality of prongs angled generally interiorly and formed about the mechanical seal. The prongs are spaced apart to receive and retain an end of a thermoplastic pipe.

The plurality of prongs of the capture ring may be equally spaced around a circumference of the circular body and each of the plurality of prongs may include a sloping face. The capture ring may further include a plurality of teeth extending from the circular body. The plurality of teeth and the plurality of prongs may be configured to extend from the circular body in opposite directions.

The kit may further include a fusion seal that includes a thermoplastic sleeve having a heating element. The sleeve includes a tapered end adapted to coact with the first inner tapered end. The sleeve has an inner surface configured to receive a thermoplastic pipe.

The mechanical seal of the kit may include a body having a tapered portion with an inner surface and a substantially cylindrical portion extending from the tapered portion; a plurality of sealing rings formed on the inner surface of the tapered portion; and at least one stepped ring projecting interiorly from the tapered portion to establish a sealing ledge. Alternatively, the mechanical seal may include a body having a tapered portion with an inner surface and a substantially cylindrical portion extending from the tapered portion; and a sealing ring formed on the inner surface of the tapered portion.

In addition, the present invention is directed to a method for joining thenuoplastic piece of pipe with a pipe coupling. The method includes the steps of: a) providing a piece of thermoplastic pipe; b) providing a mechanical seal; c) providing a pipe coupling having a first side and a second side; d) providing a capture ring; e) positioning the mechanical seal and the capture ring within the first side of the pipe coupling; f) passing a first end of one of the pieces of thermoplastic pipe into the first side of the pipe coupling, mechanical seal and the capture ring; and g) forming a fluid tight seal between the thermoplastic pieces of pipe and the pipe coupling by compressing the mechanical seal with a nut coacting with the pipe coupling. The capture ring defines a central aperture and includes a circular body with a plurality of prongs extending therefrom.

The method may further include the steps of: h) attaching at least one fusable seal to a first end of a second piece of thermoplastic pipe; i) passing the first end of the second piece of thermoplastic pipe into the second side of the pipe coupling; and j) heating the fusable seal until the seal and adjacent portions of the pipe coupling and the second piece of thermoplastic pipe melt.

The plurality of prongs of the capture ring may be equally spaced around a circumference of the circular body and each of the plurality of prongs may include a sloping face. The capture ring may further include a plurality of teeth extending from the circular body. The plurality of teeth and the plurality of prongs may be configured to extend from the circular body in opposite directions.

The mechanical seal may include a body having a tapered portion with an inner surface and a substantially cylindrical portion extending from the tapered portion; a plurality of sealing rings formed on the inner surface of the tapered portion; and at least one stepped ring projecting interiorly from the tapered portion to establish a sealing ledge. Alternatively, the mechanical seal may include a body having a tapered portion with an inner surface and a substantially cylindrical portion extending from the tapered portion; and a sealing ring formed on the inner surface of the tapered portion.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE PRESENT INVENTION

Figure 1:
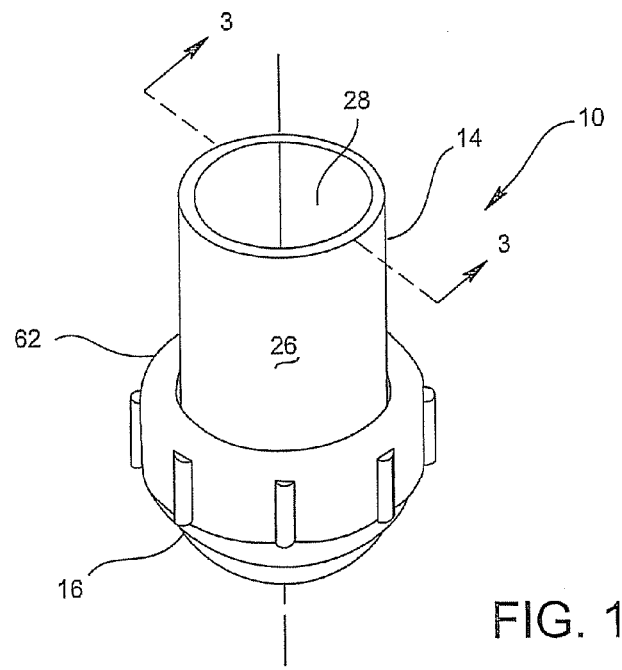
FIG. 1 is an elevational view of a partially assembled pipe coupling system made in accordance with the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
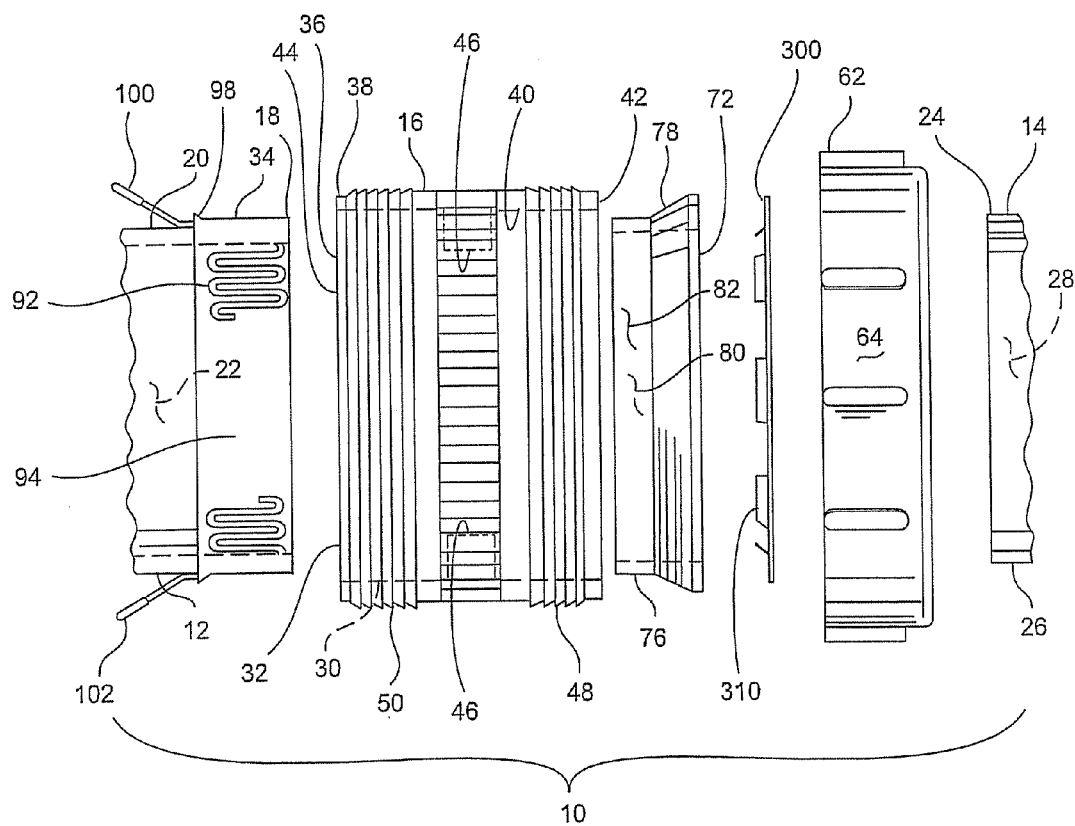
FIG. 2 is an exploded side view, of the pipe coupling system of FIG. 1 with various structures rearranged for illustration purposes.

With reference to FIGS. 1 and 2, a pipe coupling system 10 includes a first thermoplastic pipe 12 and a second thermoplastic pipe 14 secured to each other by a pipe coupling or pipe fitting 16. The first thermoplastic pipe 12 and the second thermoplastic pipe 14 may be constructed from a polymeric material such as, but not limited to, polypropylene. An example of such a polypropylene is manufactured by Montell North America, Three Little Falls Centre, 2801 Centerville Road, Wilmington, Del. 19808.

The first thermoplastic pipe 12 is formed with a first thermoplastic pipe first end 18 and a first thermoplastic pipe outer surface 20. A first thermoplastic pipe passageway 22 is defined by an inner surface of the first thermoplastic pipe 12. The second thermoplastic pipe 14 includes a second thermoplastic pipe 14 first end 24 and a second thermoplastic pipe outer surface 26. An inner surface of the second thermoplastic pipe 14 defines a second thermoplastic pipe passageway 28. The pipe coupling 16 includes an inner surface defining a pipe coupling passageway 30.

As shown in FIG. 2, the first thermoplastic pipe passageway 22, the second thermoplastic pipe passageway 28, and the pipe coupling passageway 30 are in fluid communication. In general, the first thermoplastic pipe 12, the second thermoplastic pipe 14, and the pipe coupling 16 are substantially cylindrically in shape. However, the shapes of the components described herein may take the form of other shapes and may also further define such passageways having other cross-section forms, such as square, oval, and others.

With continued reference to FIGS. 1 and 2, the pipe coupling 16 includes a mechanical sealing surface 32 that is adapted or configured to receive a seal such as a mechanical seal 72 or a fusion seal 34.

The fusion seal 34 includes a circumferential-looped electrical resistive wire 92 embedded within a cylindrical thermoplastic sleeve 94. The electrical resistive wire or heating element 92 may be made out of nickel-chrome or a normal heating wire with nickel plate. In some instances, the electrical resistive wire 92 is made of eighteen (18) gage wire and has a resistance measured in ohms per inch. The resistance of the wire varies depending on the application. Further, the thermoplastic sleeve 94 may be made of a polypropylene, such as that previously described and used for the thermoplastic pipe 12 and 14. The thermoplastic sleeve 94 includes an integral tapered portion 98. Exposed electrical resistive wire lead 100 and 102 are attached to the resistive wire 92, such a fusion seal is disclosed in U.S. Pat. Nos. 6,250,686; 6,450,544; and 6,680,464.

In operation, electric current, having a voltage of typically 120 volt AC (alternating current), is passed through the resistive wire 92 via the leads 100 and 102. The electric current causes the resistive wire 92 to heat, thereby causing the thermoplastic sleeve 94 and adjacent portions of thermoplastic pipe 12 and the pipe coupling 16 to melt. After a period of time, the electric current is stopped from passing through the resistive wire 92. The thermoplastic of the pipe 12, the pipe coupling 16 and the sleeve 94 are permitted to cool and harden, thereby forming a fluid tight seal between the first thermoplastic pipe 12 and the coupling 16. The exposed leads 100 and 102 and the exposed resistive wire 92 may then be cut and removed from the thermoplastic sleeve 94. Alternatively, the exposed leads 100 and 102 can be left alone for future heating and melting of the thermoplastic sleeve 94, should a leak develop or the pipe need to be replaced.

The pipe coupling 16 may be constructed from a polymeric and thermoplastic material. For instance, the pipe coupling 16 may be constructed from the same thermoplastic material used for the first thermoplastic pipe 12 and the second thermoplastic pipe 14.

Figure 3:
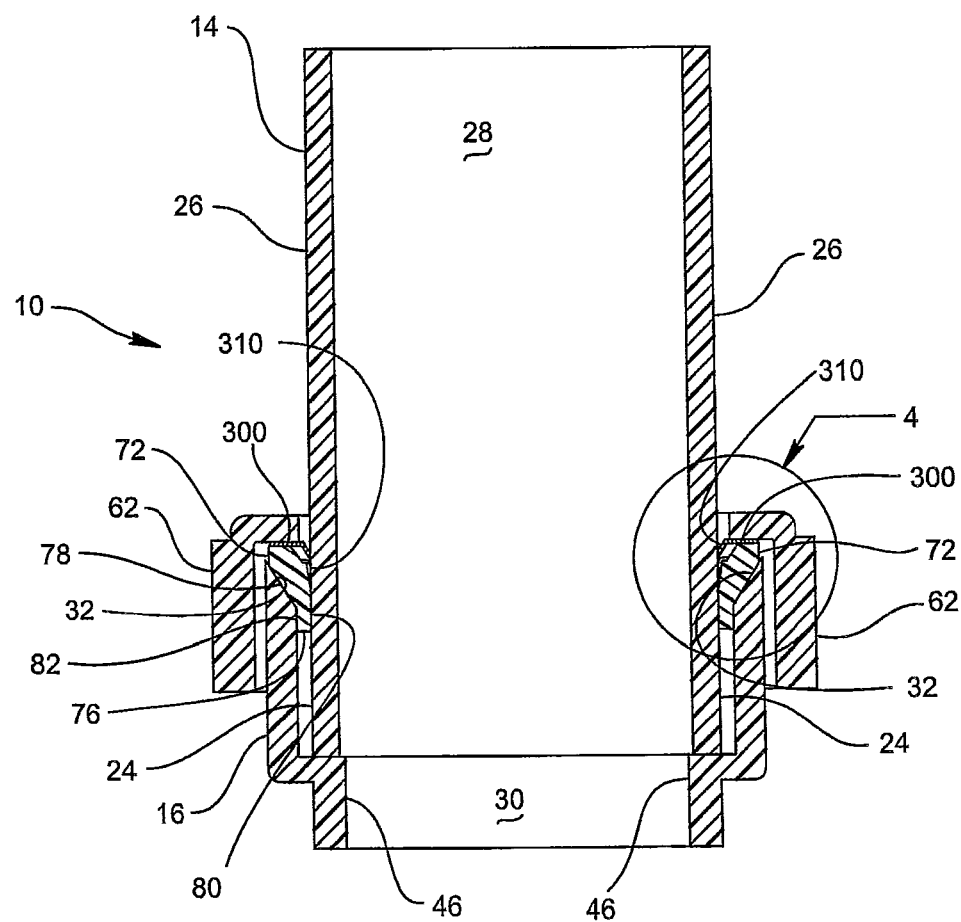
FIG. 3 is a section-view taken about section line 3-3 of components of the pipe coupling system of FIG. 1.

With reference to FIG. 3 and with continuing reference to FIGS. 1 and 2, the pipe coupling 16 includes a pipe coupling body 36 having a pipe coupling outer surface 38 and a pipe coupling inner surface 40. The pipe coupling 16 includes a pipe coupling first end 42 and an oppositely positioned pipe coupling second end 44.

An annular lip 46 is defined by the pipe coupling inner surface 40 midway between the pipe coupling first end 42 and the pipe coupling second end 44, which are positioned on opposite sides of the annular lip 46. A first set of threads 48 is defined adjacent the pipe coupling first end 42 and a second set of threads 50 is defined adjacent the pipe coupling second end 44. The threads 48 and 50 are defined as the pipe coupling outer surface 38.

FIGS. 1, 2, and 3 also depict a nut 62 that is used in the pipe coupling system 10 when the mechanical seal 72 is used. Such mechanical seals are disclosed in U.S. Pat. Nos. 6,250,686; 6,450,544; and 6,680,464. In modified configurations, a combination of the nut 62, the mechanical seal 72, and the fusion seal 34 may be utilized. The nut 62 is configured to coact with the first and or second set of threads 48, 50 of the pipe coupling 16. The nut 62 may also be made of a polypropylene and includes a body 64. Additionally, the nut 62 may be made of the same thermoplastic material as the pipe coupling 16.

Figure 4:
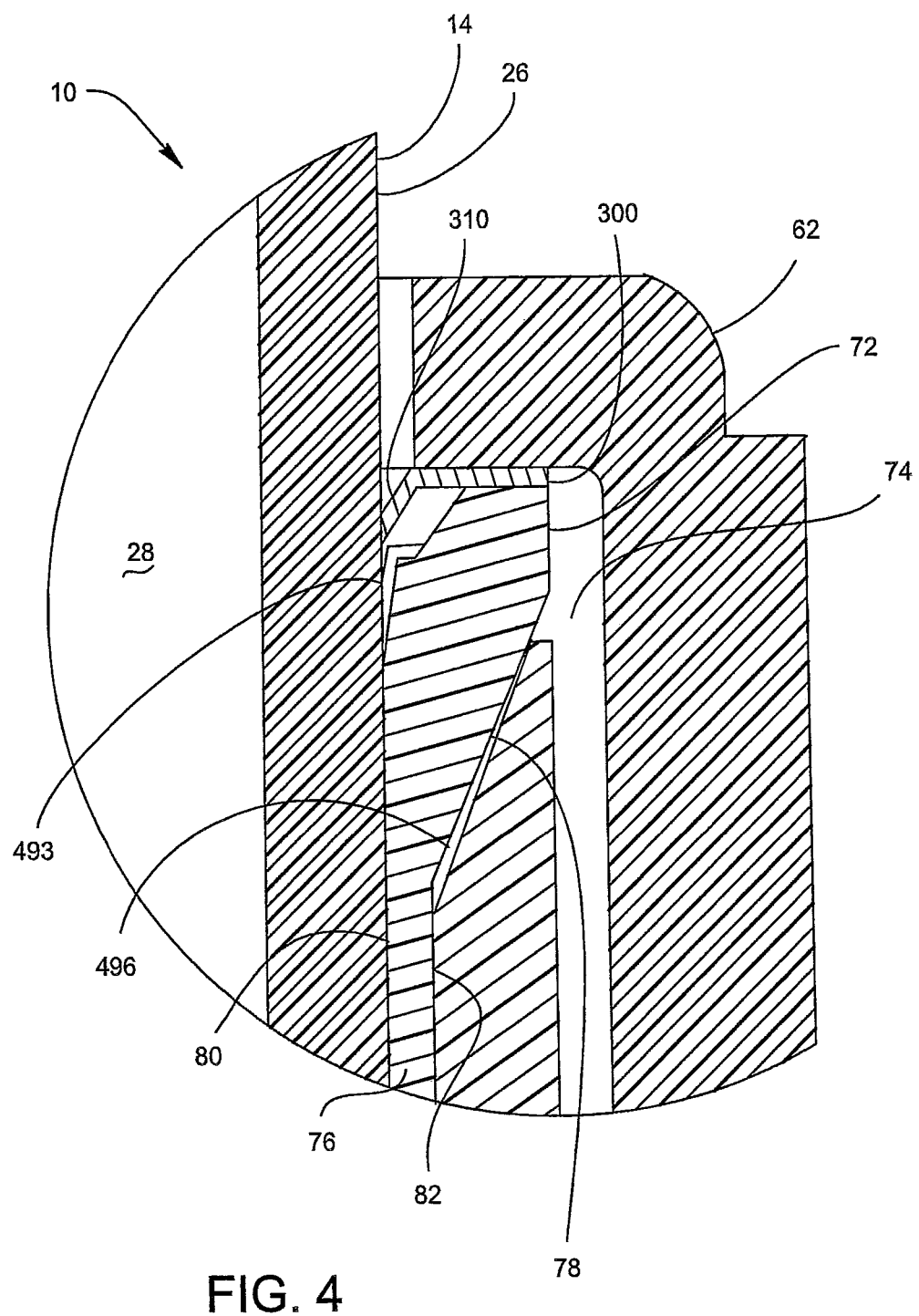
FIG. 4 is an enlarged detail view taken about detail view line 4 of the pipe coupling system of FIG. 3.

In FIGS. 2, 3, and 4, and in subsequent illustrations, various assembly capture joint components are described that improve the ease with which the components of the invention may be used. More specifically, such components are described in the context of new mechanical and fusion seals with capture and sealing features and new capture rings, which components can be used alone or in combination to enable more convenient assembly of the contemplated pipe coupling system 10.

In a certain configuration as will be described in more detail below, a mechanical capture ring 300 defining a central aperture 320 (shown in FIGS. 16 and 17) and with prongs 310 is depicted. The capture ring 300 is configured to be seated adjacent to the mechanical seal 72 and between the pipe coupling 16 and the nut 62. The capture ring 300 is arranged whereby the prongs 310 are angled in a direction that is generally concentrically inward towards the central aperture 320 (FIG. 13) defined within the capture ring 300.

Figure 13:
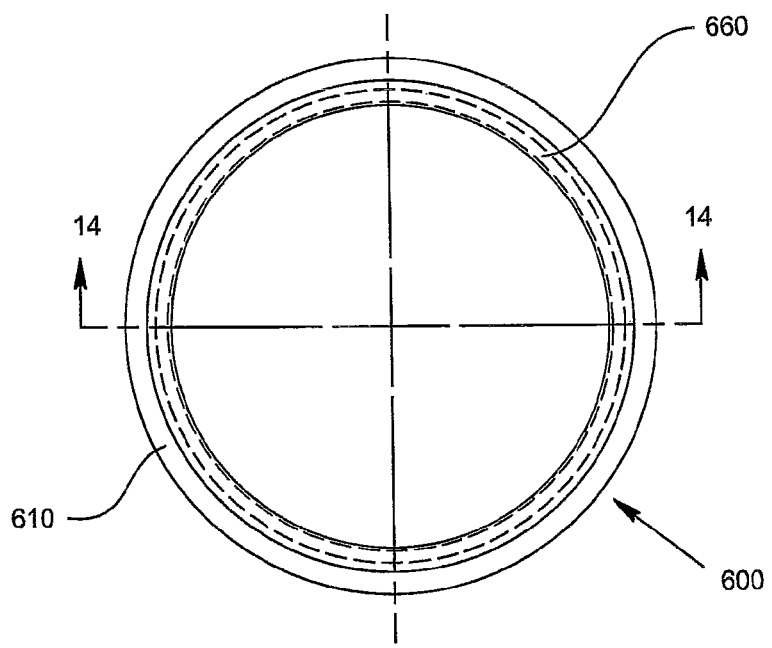
FIG. 13 is a top view of a variation of the component of FIG. 5 and according to the invention.
Figure 14:
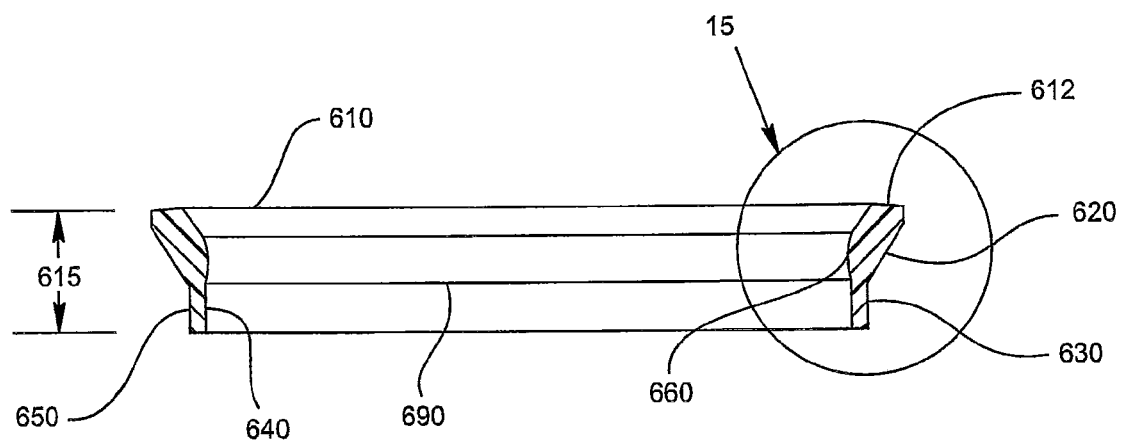
FIG. 14 is a section-view taken about section line 14-14 of FIG. 13.

The prongs 310 are also substantially angled towards a longitudinal direction that is parallel to the passageways 22, 28, 30, and to be slightly or substantially angled as illustrated in FIGS. 2 and 13. Additionally, as depicted in FIG. 2, the capture ring 300 is arranged when assembled to have the prongs 310 projecting substantially away from the nut 62 and towards the pipe coupling 16.

In certain configurations, the capture ring 300 is seated and loosely retained between the pipe coupling 16 and the nut 62, which are partially assembled together to form an assembly capture joint. Next, the first end 24 of the second thermoplastic pipe 14 is stabbed, urged, or pushed through the center of the nut 62. As the first end 24 of the second pipe 14 is urged towards the pipe coupling 16, the first end 24 is received within the capture ring 300. With this arrangement, the second pipe 14 is preliminarily captured and held in place until the nut 62 can be completely tightened onto the threads 48 of the pipe coupling 16, to form a permanent joint. The capture ring 300 and an alternative embodiment of the capture ring are discussed in more detail below after a discussion of other components.

Figure 5:
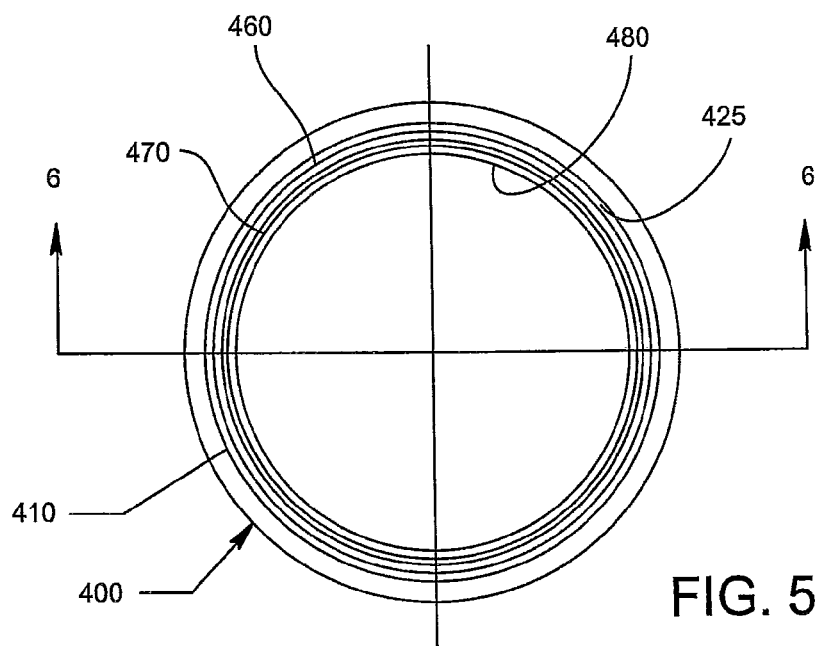
FIG. 5 is a top plan view of a component of FIG. 2 of the pipe coupling system of the invention.

With reference now also to FIG. 5, a variation of the mechanical seal 72 is shown, which is configured as a capture component and as a second type of mechanical seal 400. Such a second mechanical seal 400 is formed with an inner seal edge 410. As with mechanical seal 72, second seal 400 is also adapted to be received between a gap 74 defined between a pipe, in this case the second thermoplastic pipe 14, and the pipe coupling 16, which can be understood from FIG. 4, among other illustrations herein.

Also as with earlier configurations, the second mechanical seal 400 may be formed with a flexible, polymeric, thermoplastic body 415 and to have a tapered portion 420 with an inner surface 425. The seal 400 may also optionally incorporate a substantially cylindrical portion 430 fitted to and or integrally attached to the seal 400. Although many shapes are contemplated as described elsewhere herein, the second mechanical seal 400 may also have a substantially cylindrical inner surface 440 and an outer surface 450. Even so, rectangular and other cross-sections may have particular utility in certain applications.

The second mechanical seal 400 is further formed with one or more or a plurality of inner circumferential and sealing rings 460, 470, and 480, which are formed on the inner surface 425 of the tapered portion 420. However, other configurations may also be adapted with one or all of the sealing rings 460, 470, and 480 formed about inner surface 440 of the cylindrical portion 430. In yet other arrangements, such rings can be formed on both the noted inner surfaces 425, 440.

In optional configurations of the pipe coupling system 10, the rings 460, 470, and 480 are adapted to generally project away from the inner surface 425 of the tapered portion 420, or the inner surface 440. In other modified configurations, at least one of the inner circumferential and stepped rings such as stepped ring 480 may project interiorly from the tapered portion 420 to further establish an additional capture and or sealing ledge 490. In any of its arrangements, the second mechanical seal 400 can be loosely seated between the nut 62 and the pipe coupling 16 to form the assembly capture joint. Depending upon size, shape, and position, the rings 460, 470, 480, and the ledge 490 can individually and or collectively establish the capture capability, and can also establish a preliminary seal, and a more permanent capture and seal once the nut 62 is fully engaged about the threads 48 of the pipe coupling 16.

In one procedure or use of the pipe coupling system 10, the pipe coupling 16, the second mechanical seal 400, and the nut 62 can be loosely assembled together. The arrangement can also include the capture ring 300. Next, the first end 24 of the second pipe 14 can be stabbed through the nut 62 and urged into the pipe coupling 16.

As the first end 24 is continuously urged into the pipe coupling 16 and into the second mechanical seal 400, the outer surface 26 of the first end 24 of the second pipe 14 is urged through the rings 460, 470, and 480, and the ledge 490, which are thereby deformed as they capture and or seal against the outer surface 26. The second pipe 14 is thereby captured by the proposed assembly capture joint. If the capture ring 300 is included, the first end 24 also passes through the aperture 320 and is engaged by the prongs 310. This capability is more fully discussed below. Lastly, the nut 62 is tightened securely to the pipe coupling 16.

As the nut 62 is tightened, the second pipe 14 will be retained in position against the pipe coupling 16 by the second mechanical seal 400, and optionally also by the capture ring 300, as the second pipe 14 is now captured while tightening of the nut 62 continues. Once fully tightened, the nut 62 urges against and more aggressively deforms the second mechanical seal 400, which seals the pipe coupling 16 and the second mechanical seal 400 against the outer surface 26 of the first end 24 of the second thermoplastic pipe 14.

Figure 6:
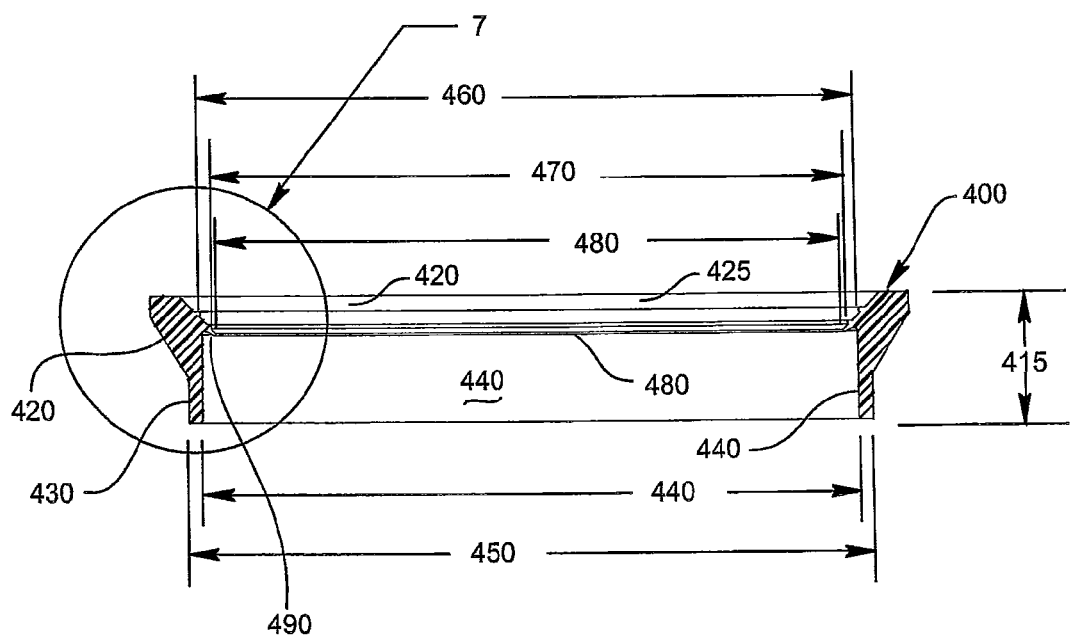
FIG. 6 is section-view taken about section line 6-6 of the component of FIG. 5.
Figure 7:
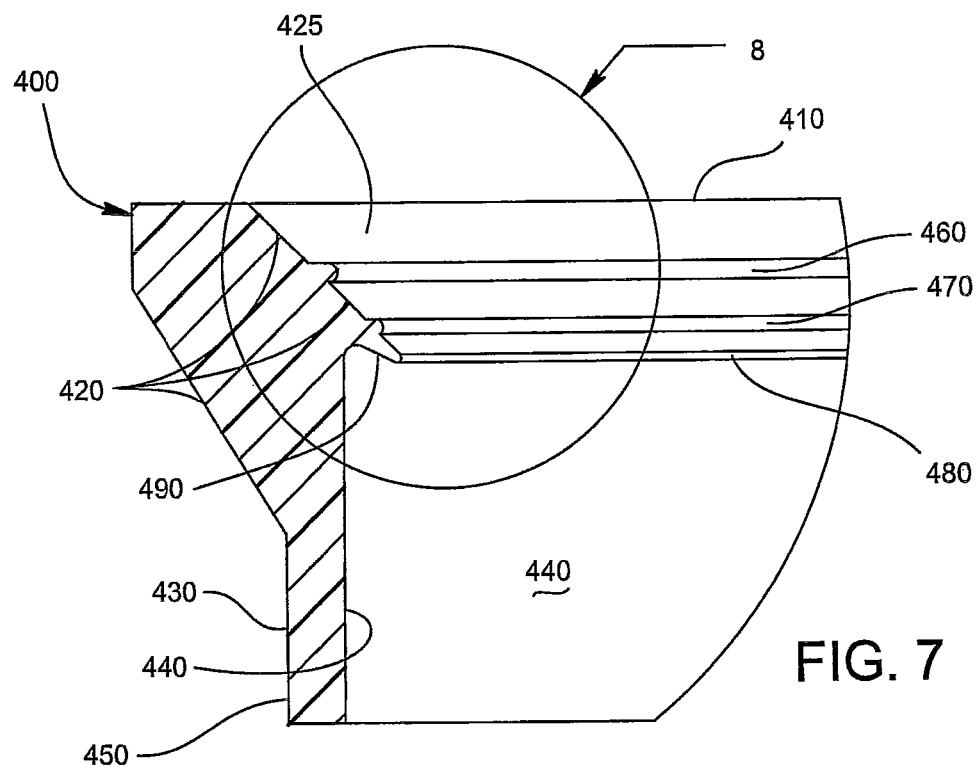
FIG. 7 is an enlarged detail view taken about detail view line 7 of FIG. 6.
Figure 8A:
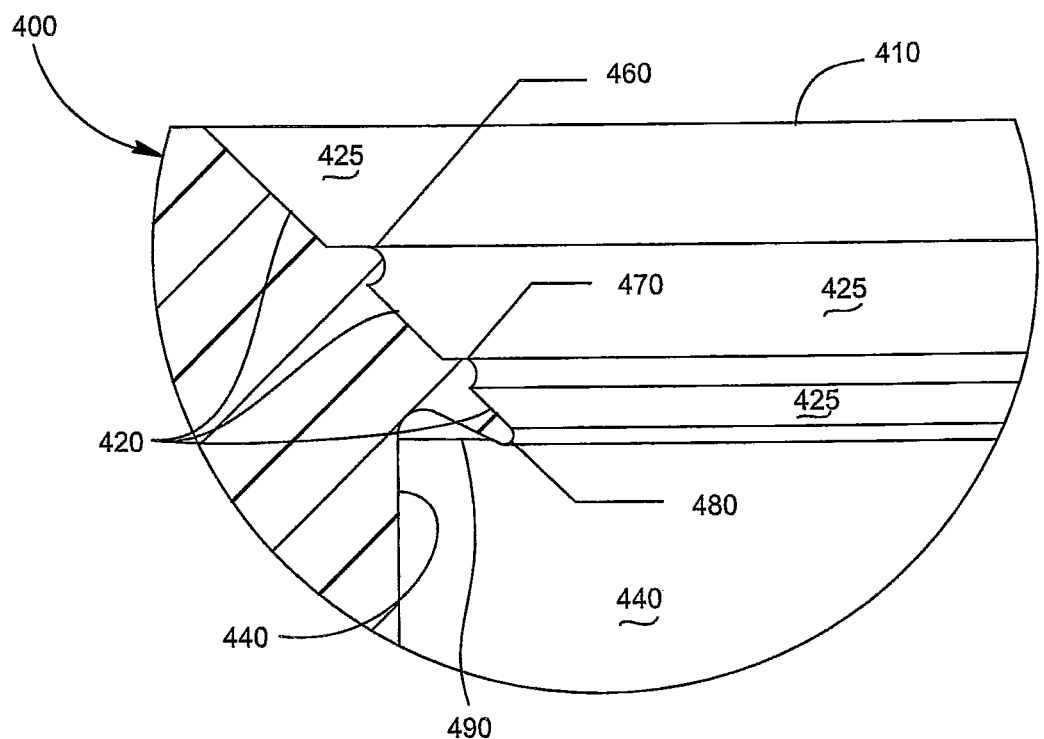
FIG. 8a is another enlarged detail view taken about detail view line 8 of FIG. 7.
Figure 8B:
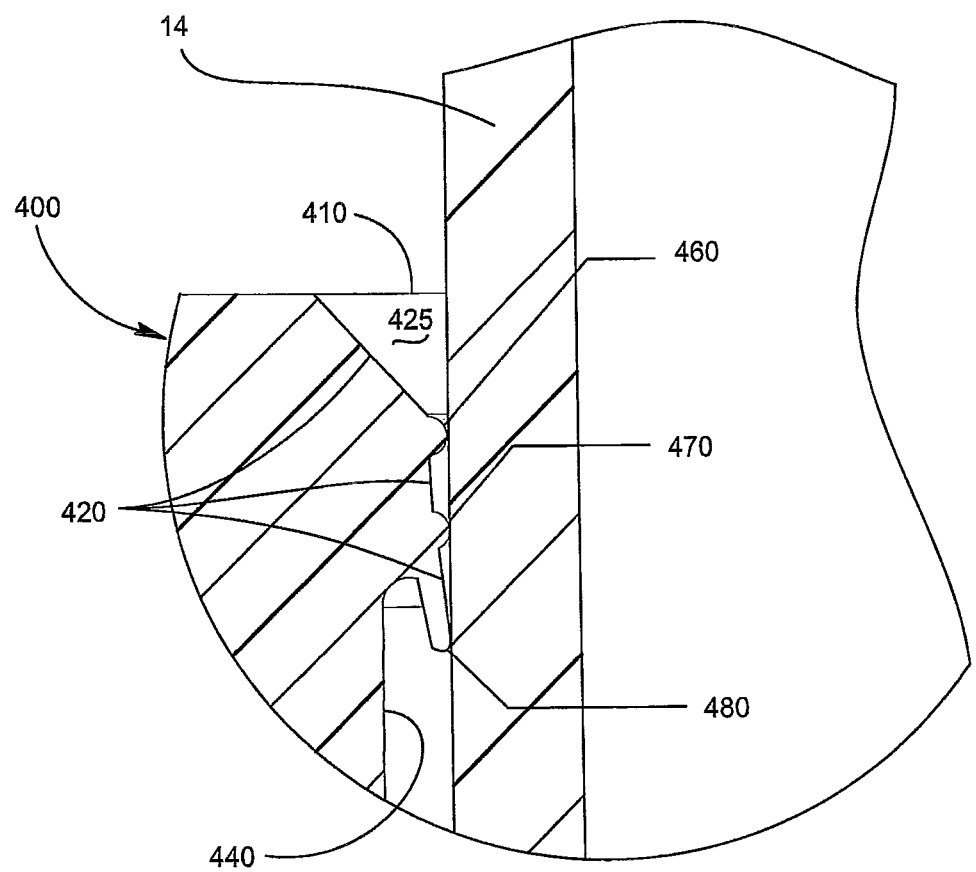
FIG. 8b is an enlarged detail view of the component of FIG. 5 showing a pipe positioned therein.
Figure 9:
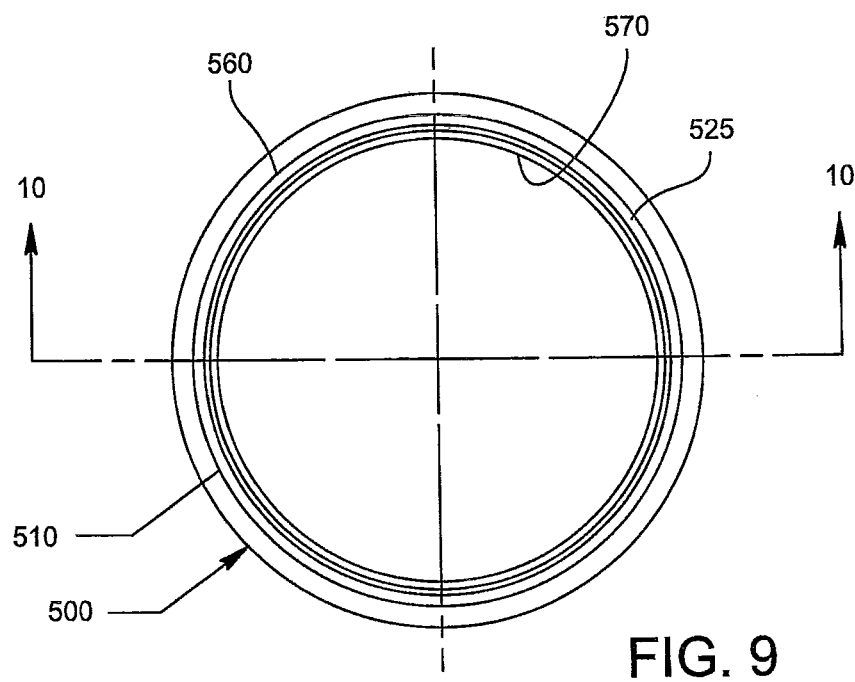
FIG. 9 is a top view of a variation of the component of FIG. 5 and according to the invention.
Figure 10:
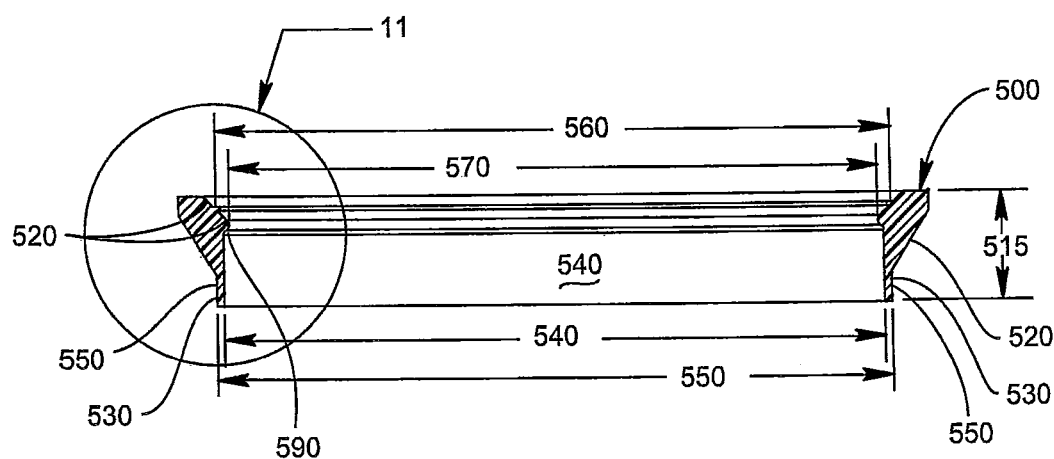
FIG. 10 is a section-view taken about section line 10-10 of FIG. 9.
Figure 11:
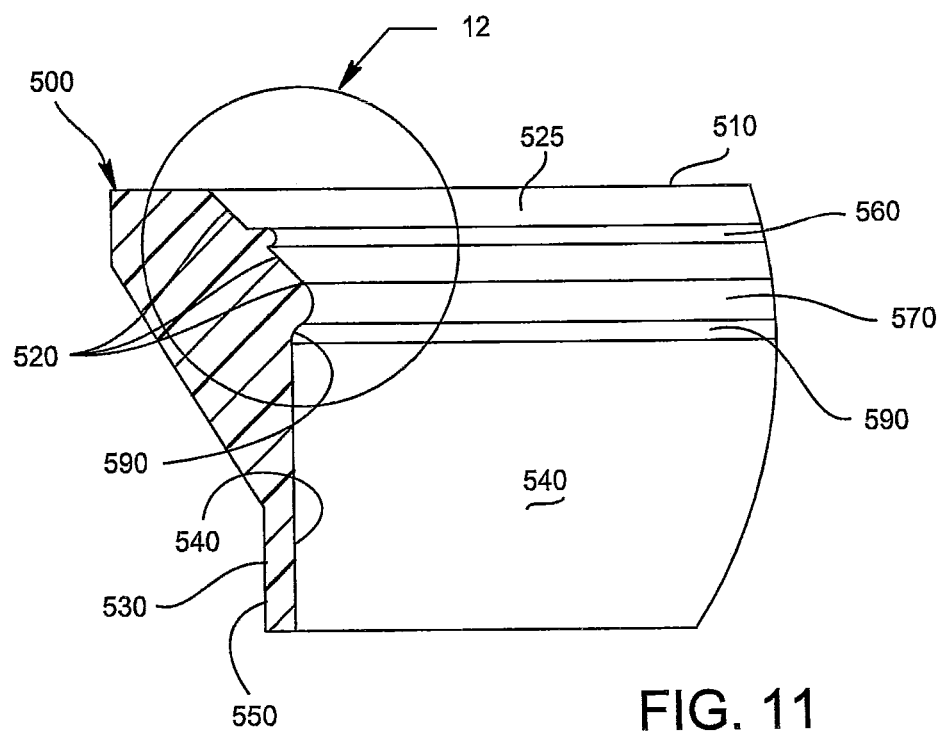
FIG. 11 is an enlarged detail view taken about detail line 11 of FIG. 10.
Figure 12A:
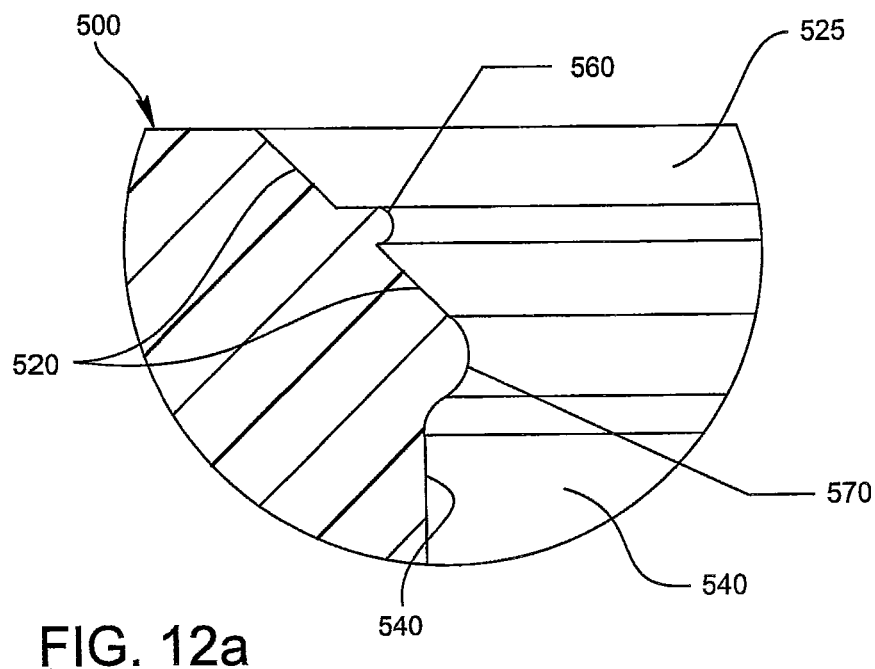
FIG. 12a is another detail view, taken about detail line 12 of FIG. 11.
Figure 12B:
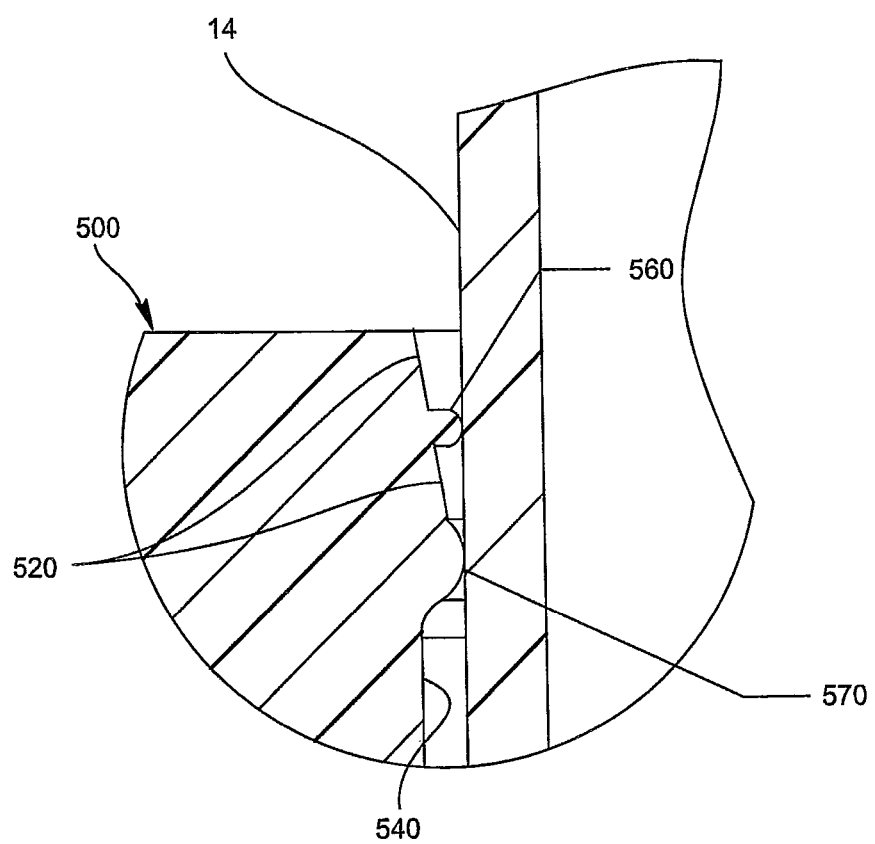
FIG. 12b is an enlarged detail view of the component of FIG. 9 showing a pipe positioned therein.

Depending upon the desired configuration and operational capabilities, the rings 460, 470, and 480, and the ledge 490 may be sized and shaped to have variously desired characteristics that can include the capability to capture and retain the first end 24 of the second thermoplastic pipe 14. Further, as shown in the various figures and in FIGS. 6, 7, and 8, the rings 460, 470, and 480, and the ledge 490 may sealingly coact with the outer surface 26 of the second thermoplastic pipe 14, to thereby form a sealed interface. Various sizes, shapes, quantities, and positions of such rings 460, 470, and 480, and the ledge 490 are contemplated whereby capture can be accomplished during the assembly process. Further, preliminary sealing and permanent sealing can be similarly accomplished.

As may be understood from reference also to FIG. 4, the rings 460, 470, and 480, and the ledge 490 of tapered portion 420 shown in FIGS. 5-8a may form deformation 493 (FIG. 4) when the second thermoplastic pipe 14 is captured by the rings 460, 470, and 480 of the alternative second seal 400, and is received in the pipe coupling 16. As the first end 24 of the second pipe 14 is urged into the pipe coupling 16, the outer area of the tapered portion 420 also may continue to deform to establish a second capture and or sealing deformation 496 (see FIG. 8b).

In FIGS. 9, 10, 11, 12a and 12b, another alternative and third mechanical seal 500 is also contemplated by the invention, and may have a configuration similar to second mechanical seal 400, with an inner seal edge 510 and a flexible, polymeric, theiinoplastic body 515. A tapered portion 520 with inner surface 525 is also included. As an option, a fitted and or integrally formed and substantially cylindrical portion 530 is contemplated and can have an inner and substantially cylindrical or other shaped portion 530 with an inner surface 540, and outer surface 550. The alternative third mechanical seal 500 may also incorporate fewer and one or more inner circumferential and stepped rings 560 and 570, which can extend to optionally further establish capture and or sealing ledge 590. FIG. 12 b illustrates the deformation of rings 560 and 570 when second pipe 14 is urged into pipe coupling 16.

Figure 15A:
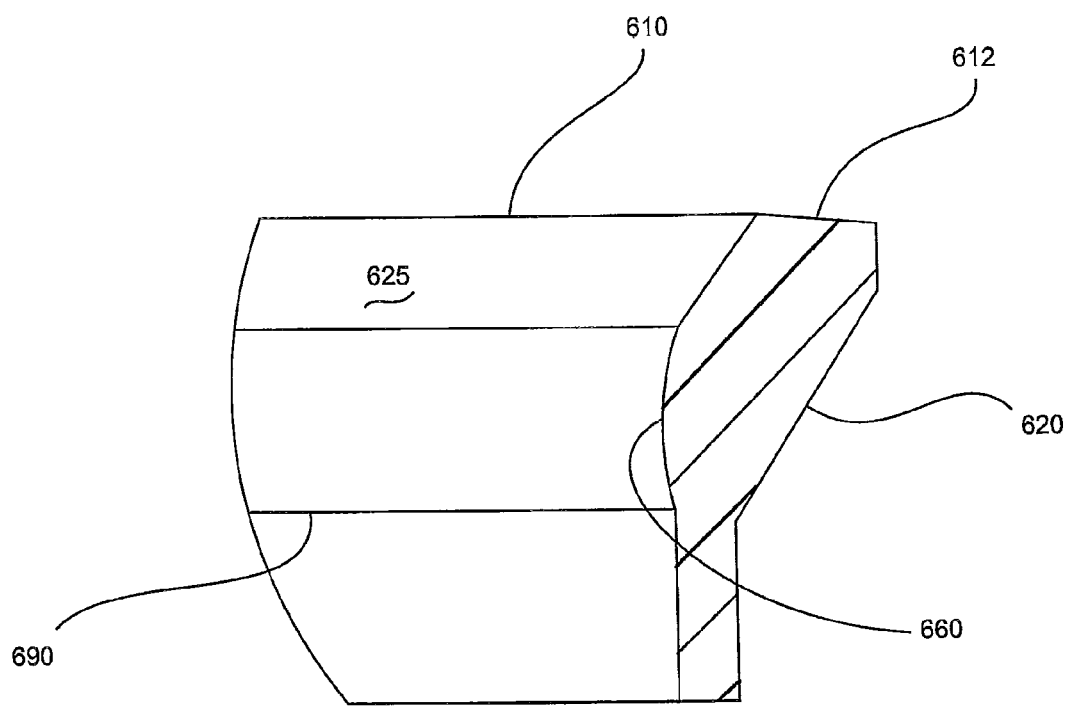
FIG. 15a is an enlarged detail view taken about detail line 15 of FIG. 14.
Figure 15B:
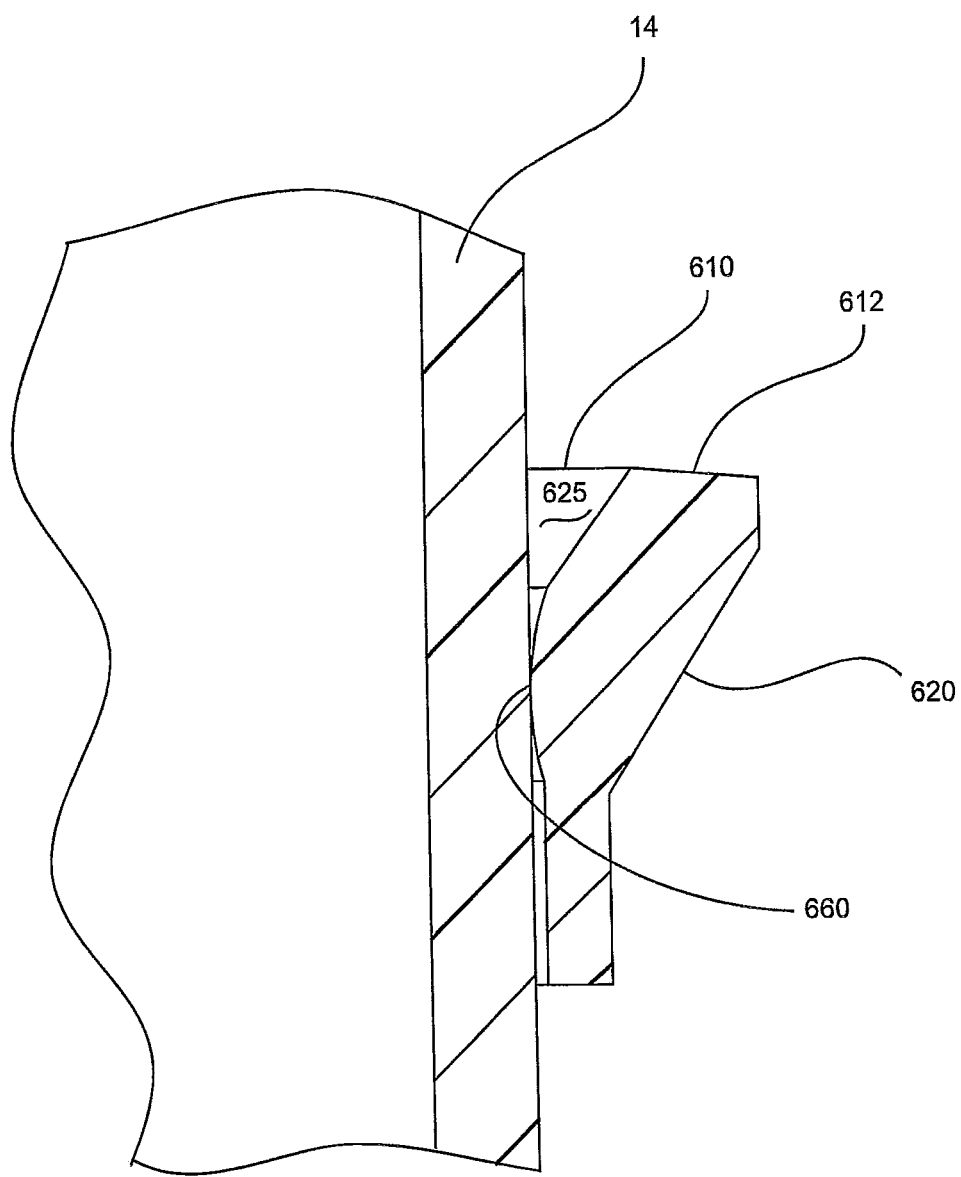
FIG. 15b is an enlarged detail view of the component of FIG. 13 showing a pipe positioned therein.

In FIGS. 13, 14, 15a and 15b another alternative and fourth mechanical seal 600 is also contemplated by the invention, and may have a configuration similar to second mechanical seal 400, with an inner seal edge 610 and a flexible, polymeric, thermoplastic body 615. Thermoplastic body 615 includes a sloping top portion 612 and a tapered portion 620 with an inner surface 625. A fitted and/or integrally formed and substantially cylindrical portion 630 is contemplated and can have an inner and substantially cylindrical or other shaped portion 630 with an inner surface 640 and outer surface 650. The sloping top portion 612 has a gradual slope of approximately 6°, for instance. The alternative fourth mechanical seal 600 may also incorporate an inner circumferential and stepped ring 660 which can extend to establish capture and or sealing ledge 690. FIG. 15b illustrates the deformation of ring 660 when second pipe 14 is urged into pipe coupling 16.

Figure 16:
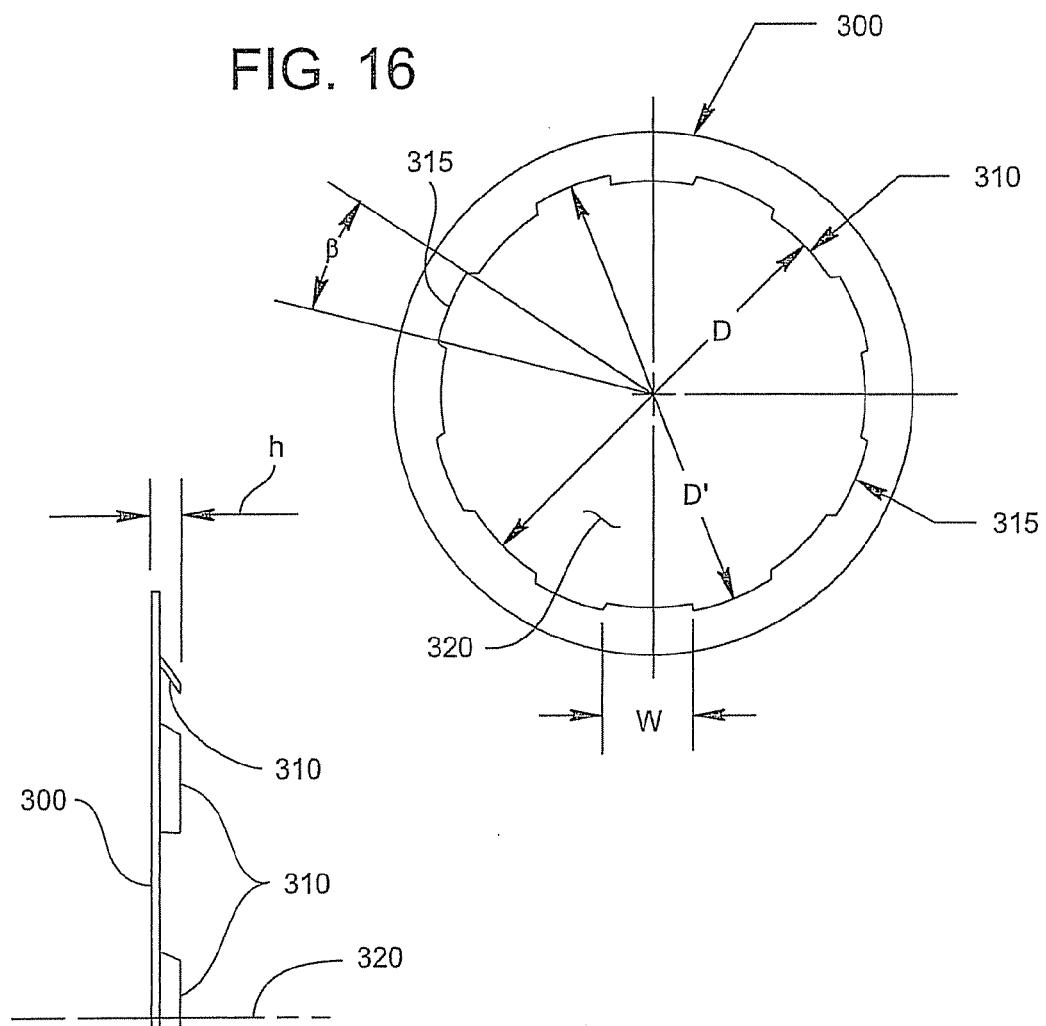
FIG. 16 is a top plan view of another component in FIG. 2 of the pipe coupling system of the invention.
Figure 17:
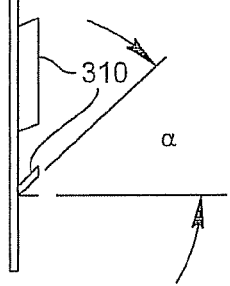
FIG. 17 is an elevational view of the component of FIG. 16.

With focus again to the capture ring 300 and now also specifically to FIGS. 16 and 17, the capture ring 300 is formed from a substantially planar, sheet material such as stainless and/or spring steel to enable flexure of the prongs 310 during operation. As previously described elsewhere, the capture ring 300 is optional and can be incorporated in any of the preceding embodiments for enabling or augmenting the assembly capture capability of the contemplated pipe coupling system 10.

As shown in FIG. 17, the prongs 310 are angled to an angle alpha, "α", which is a function of the thickness of the sheet material and the bias and flexure force to be exerted by the prongs 310. The angle "α" results in a prong height of "h" that can be further adjusted to accommodate the particular sheet thickness as well as the proposed application and joint strength, which is useful in view of the varying compositions and properties of metals, plastics, and other materials contemplated for use with the invention.

When the capture and or clip ring 300 is optionally incorporated either alone or as part of the embodiments with the mechanical and or fusion seals already described, the first end 24 of the second thermoplastic pipe 14 is urged through the nut 62, through the aperture 320, and into the pipe coupling 16.

As the first end 24 passes through the capture aperture 320, the prongs 310 counteract the insertion force by imposing a bias against the outer surface 26 of the first end 24 or the second pipe 14. The unbiased diameter "D" across the interior-most edges of the prongs 310 of the of the capture ring 300, is preferably less than the diameter of the second pipe 14 received therein. Also, the diameter D' across the gaps 315 of the capture ring 300 is greater than the diameter of the pipe to be received therein. The bias imparted by the prongs 310 establishes a positively engaging frictional force against the outer surface 26. During the preliminary assembly process, the initial, claw-like force of the prongs 310 captures the first end 24 by the bias against the outer surface 26 of the second pipe 14.

In instances where intentional or inadvertent removal of the first end 24 of the second pipe 14 during the assembly process, the considerable frictional and engaging force exerted by prongs 310 results in a bias force that attempts to increase angle "α". This in turn further increases the claw-like engagement of the outer surface 24 of the second pipe 14. With deformable polymeric and thermoplastic materials such as those contemplated here, deformation of the outer surface occurs that establishes dents about the outer surface 26, which further increases the force otherwise needed to remove the first end 24 of the second pipe 14. This effectively prevents removal of the second pipe 14 from the resulting assembly capture joint formed between nut 62 and the pipe coupling 16.

After preliminary assembly insertion of the first end 24 of the second pipe 14 through the nut 62, through the capture ring 300, and into the pipe coupling 16, the nut 62 is fully tightened onto the threads 48 of the pipe coupling 16. This further deflects the prongs 310 onto and preferably even into the outer surface 26 of the first end 24 of the second thermoplastic pipe 14, which results in a permanent and strong joint. In embodiments that also incorporate the contemplated mechanical and or fusion seals, an even stronger joint can thereby be established. It is contemplated that the capture ring 300 can be utilized with a fusion seal 34 in lieu of a mechanical seal 72 as also disclosed elsewhere herein.

With continued reference to FIGS. 16 and 17, the plurality of prongs 310 of width "w" of the capture ring 300 are preferably spaced apart by angle beta "β", and to thereby define relief gaps or interstices 315. A wide variety of configurations are possible to enable compatibility with a large number of possible materials, which can have varying hardness and other properties. In optional embodiments of the invention that include a mechanical and or fusion seal, and the proposed capture ring, joining of similar and dissimilar materials is possible.

Figure 18:
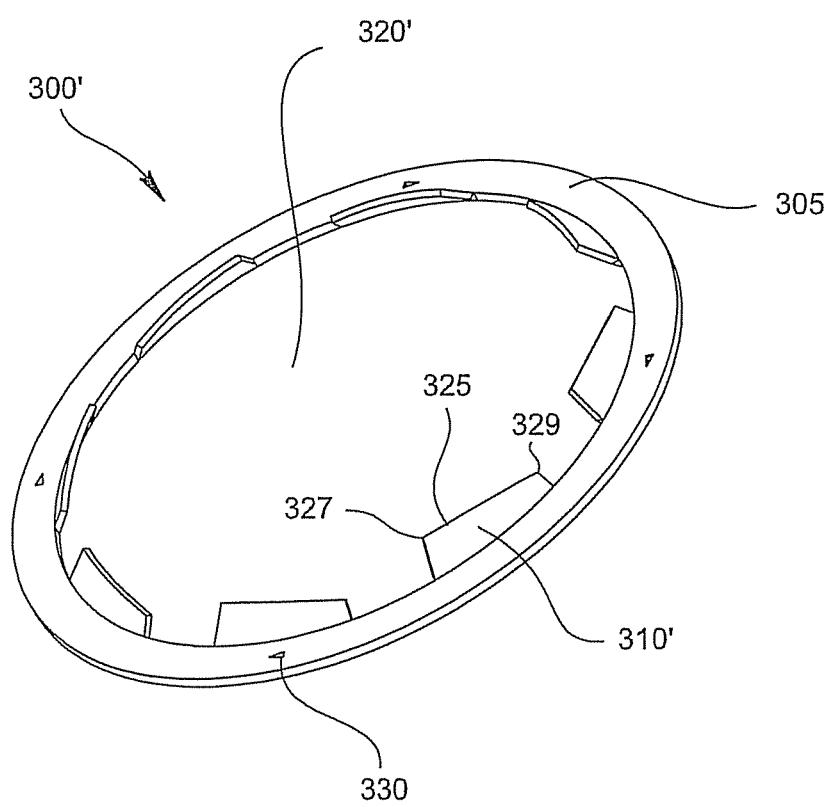
FIG. 18 is a perspective view of another embodiment of the capture ring of FIG. 16.
Figure 19:
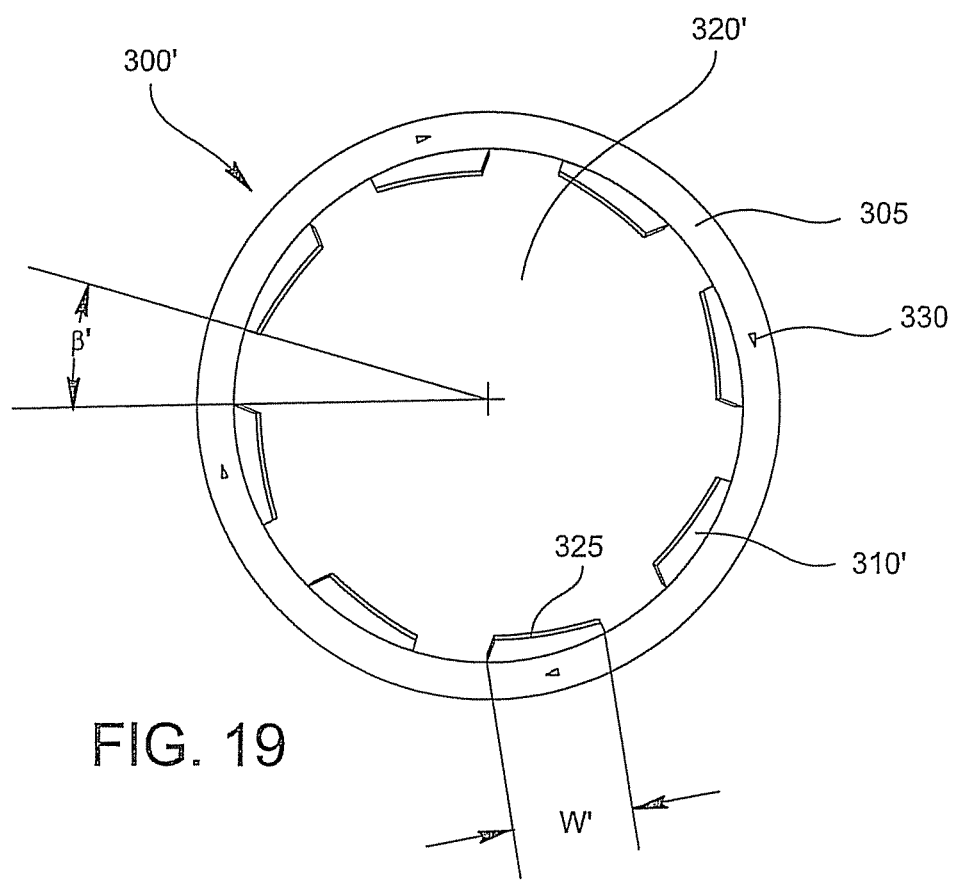
FIG. 19 is a top plan view of the capture ring of FIG. 18.
Figure 20:
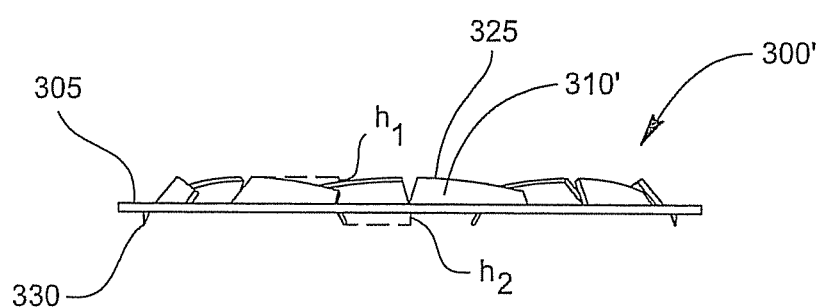
FIG. 20 is a side elevational view of the capture ring of FIG. 19.

With reference to FIGS. 18-20, an alternate embodiment of capture ring 300' defining a central aperture 320' and includes a circular body 305 with a plurality of prongs 310' extending therefrom. The capture ring 300' is also configured to be seated adjacent to the mechanical seal 72 and between the pipe coupling 16 and the nut 62. Desirably, the capture ring 300' is arranged whereby the prongs 310' are angled in a direction that is generally concentrically inward towards the central aperture 320' defined within the capture ring 300'.

The prongs 310' are also substantially angled towards a longitudinal direction that is parallel to the passageways 22, 28, 30, and are slightly or substantially angled as illustrated in FIGS. 18 and 20. Additionally, the capture ring 300' is arranged when assembled to have the prongs 310' projecting substantially away from the nut 62 and towards the pipe coupling 16.

The plurality of prongs 310' are equally spaced around the entire circumference of the circular body 305 of the capture ring 300'. Each of the plurality of prongs 310' have a width of "w'" and are spaced apart by an angle beta "β'". Each of the plurality of prongs 310' further includes a sloping face 325. The sloping face 325 has a first edge 327 and a second edge 329. The first edge 327 is positioned at a height "$h_1$" above the second edge thereby forming the sloping face 325. Height "$h_1$" may be about 0.025 inches to about 0.075 inches, and desirably about 0.050 inches.

The capture ring 300' further includes a plurality of teeth 330 equally spaced around the circumference of circular body 305. The teeth 330 desirably have a triangular shape and extend away from circular body 305 in a direction opposite the direction of the plurality of prongs 310'. The teeth 330 extend a distance "$h_2$" from circular body 305. Distance "$h_2$" may be about 0.025 inches to about 0.075 inches, and desirably about 0.050 inches. The teeth 330 are adapted to engage the nut 62 thereby allowing capture ring 300' to rotate with the nut 62 as the nut 62 is being tightened.

In operation, the capture ring 300' is seated and loosely retained between the mechanical seal 72 and the nut 62, which are partially assembled together with the pipe coupling 16 to form an assembly capture joint. Next, the first end 24 of the second thermoplastic pipe 14 is stabbed, urged, or pushed through the center of the nut 62. As the first end 24 of the second pipe 14 is urged towards the pipe coupling 16, the first end 24 is received within the capture ring 300'. As the first end 24 passes through the capture aperture 320', the prongs 310' counteract the insertion force by imposing a bias against the outer surface 26 of the first end 24 or the second pipe 14. The bias imparted by the prongs 310' establishes a positively engaging frictional force against the outer surface 26 of the first end 24 of the second pipe 14. During the preliminary assembly process, the initial, claw-like force of the prongs 310' captures the first end 24 by the bias against the outer surface 26 of the second pipe 14.

At this point, the second pipe 14 is preliminarily captured and held in place until the nut 62 can be completely tightened onto the threads 48 of the pipe coupling 16 to form a permanent joint. As the nut 62 is rotated teeth 330 engage the nut 62 thereby allowing the capture ring 300' to rotate with the nut and compress the mechanical seal 72. Additionally, the sloping faces 325 of the prongs 310' of the capture ring 300' allow the capture ring 300' to be rotated downward during rotation of the nut 62 thereby compressing the mechanical seal 72.

Although not expressly illustrated in the figures, the configurations and modifications of the embodiments described herein also contemplate application wherein the fusion seal 34 is adapted to incorporate one or more elements as may be desired in further embodiments. Specifically, the fusion seal 34 may be adapted with a tapered portion such as tapered portions 420, 520. Also, rings 460, 470, 480, 560, 570, 660 and ledges 490, 590, 690 may be incorporated if deemed appropriate to any particular application.

In yet further configurations, the capture ring 300 and or its prongs 310 may be integrally formed on or about various portions of the proposed mechanical seals and elements thereof. For example, during the fabrication of a seal such as mechanical seal 400, the prongs 310 may be affixed to or integrally molded into or onto the inner surface 425 of the tapered portion 420. In combination or alternatively, the prongs 310 may be affixed and or molded into or onto the inner surface 440 of the fitted and or integrally formed cylindrical portion 430.

The present invention can be supplied as a kit for connecting thermoplastic pipe when the kit includes a pipe coupling 16 and related accessories including one or more nuts 62, fusion seals 34, capture rings 300, 300' and mechanical seals 72, 400, 500, 600. Also, although thermoplastic is the preferable material for the components making up the invention, it is contemplated that other plastic materials or copolymers can be used, and that such use can be adapted for connection of like and dissimilar materials including metals, and combinations of metals and plastics.

Although the invention has been described in detail for the purpose of illustration based on what is currently considered to be the most practical embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A piping system incorporating a mechanical seal comprising:
   a first pipe made of thermoplastic material having a first pipe first end;
   a conduit having a body, the body having a conduit first end, the body having an outer surface and an inner surface, the inner surface defining a passageway, and a first receiving profile, the first pipe first end received by the conduit first end, the first receiving profile positioned coaxially with the first pipe;
   the mechanical seal for securing the first pipe to the conduit, the mechanical seal positioned within the first receiving profile and comprising:
      a seal body having a first end and a second end, the seal body having a tapered portion with a radially inward facing tapered surface positioned at the first end of the seal body and a substantially cylindrical portion extending from the tapered portion towards the second end of the seal body;
      a plurality of sealing rings formed on the radially inward facing tapered surface of the tapered portion of the mechanical seal; and
      at least one stepped ring positioned further from the first end of the seal body than the plurality of sealing rings, the stepped ring projecting interiorly from the tapered portion at an angle towards the second end of the seal body to establish a sealing ledge;
   a nut having a body with threads configured to be threadably received by the conduit; and
   a capture ring seated in the conduit first end and adapted to receive and retain the first pipe end during assembly, the capture ring comprising:
      an inner circumference and an outer circumference to provide the capture ring with an opening to receive the first pipe, a first surface between the inner circumference and the outer circumference, the first surface lying in a first plane, a second surface between the inner circumference and the outer circumference, the second surface lying in a second plane spaced from the first plane,
      a plurality of prongs each having a sloping face located at a radially inward end of the prong and a slope angle of the sloping face oriented in a circumferential direction, each of the plurality of prongs extending from the inner circumference of the circular body to a first height and sloping toward a lower second height above the first surface of the circular body of the capture ring, wherein the sloping faces of the prongs of the capture ring allow the capture ring to be rotated during rotation of the nut, thereby compressing the mechanical seal, and
      a plurality of teeth extending from the second surface of the circular body of the capture ring to a second height spaced from the second surface of the circular body, each of the plurality of teeth having a triangular shape and positioned between the inner circumference and an outer circumference of the second surface of the circular body of the capture ring, wherein the teeth of the capture ring engage the nut such that the capture ring rotates with the nut as the nut is being tightened, wherein the plurality of teeth of the capture ring are obliquely angled relative to the second surface of the circular body of the capture ring such that an angular rotation of the nut relative to the capture ring in a first direction produces an engagement between the nut and the plurality of teeth of the capture ring in contrast to an angular rotation of the nut relative to the capture ring in a second direction opposite to the first direction.

2. The piping system of claim 1, wherein the plurality of prongs of the capture ring are equally spaced around the inner circumference of the circular body.

3. The piping system of claim 1, wherein the second height spaced apart from the second surface of the circular body of the capture ring occurs at a triangular vertex of at least one of the plurality of triangular-shaped teeth.

4. The piping system of claim 1, wherein the triangular shape of the plurality of teeth of the capture ring is that of an isosceles triangle.

5. A kit for joining thermoplastic pipe together comprising:
- a pipe conduit, wherein the pipe conduit includes a thermoplastic body, the body having a first end and a second end, an outer surface defining threads and an inner surface, the inner surface defining a passageway, a first inner tapered surface adjacent the pipe conduit first end;
- a mechanical seal, wherein the mechanical seal includes a flexible mechanical seal body having a first end and a second end, the mechanical seal body having a tapered portion positioned at the first end of the mechanical seal body, the tapered portion adapted to coact with the first inner tapered surface, the mechanical seal flexible body having an inner surface configured to sealingly receive a thermoplastic pipe, the tapered portion of the flexible mechanical seal body comprises a radially inward facing tapered surface; and the flexible mechanical seal body further comprises: a substantially cylindrical portion extending from the tapered portion towards the second end of the mechanical seal body; a plurality of sealing rings formed on the radially inward facing tapered surface of the tapered portion of the mechanical seal; and at least one stepped ring positioned further from the first end of the mechanical seal body than the plurality of sealing rings, the stepped ring projecting interiorly from the tapered portion at an angle towards the second end of the mechanical seal body to establish a sealing ledge;
- a nut having a body with threads configured to be threadably received by the pipe conduit; and
- a capture ring seated in the conduit first end and adapted to receive and retain the first pipe end during assembly, the capture ring comprising:
  - an inner circumference and an outer circumference to provide the capture ring with an opening to receive the first pipe, a first surface between the inner circumference and the outer circumference, the first surface lying in a first plane, a second surface between the inner circumference and the outer circumference, the second surface lying in a second plane spaced apart from the first plane,
  - a plurality of prongs each having a sloping face located at a radially inward end of the prong and a slope angle of the sloping face oriented in a circumferential direction, each of the plurality of prongs extending from the inner circumference of the circular body to a first height and sloping toward a lower second height above the first surface of the circular body of the capture ring, wherein the sloping faces of the prongs of the capture ring allow the capture ring to be rotated during rotation of the nut, thereby compressing the mechanical seal, and
  - a plurality of teeth extending from the second surface of the circular body of the capture ring to a second height spaced from the second surface of the circular body, each of the plurality of teeth having a triangular shape and positioned between the inner circumference and an outer circumference of the second surface of the circular body of the capture ring, wherein the teeth of the capture ring engage the nut such that the capture ring rotates with the nut as the nut is being tightened, wherein the plurality of teeth of the capture ring are obliquely angled relative to the second surface of the circular body of the capture ring such that an angular rotation of the nut relative to the capture ring in a first direction produces an engagement between the nut and the plurality of teeth of the capture ring in contrast to an angular rotation of the nut relative to the capture ring in a second direction opposite to the first direction.

6. The kit of claim 5, wherein the plurality of prongs of the capture ring are equally spaced apart.

7. The kit of claim 5, wherein the second height spaced apart from the second surface of the circular body of the capture ring occurs at a triangular vertex of at least one of the plurality of triangular-shaped teeth.

8. The kit of claim 5, wherein the triangular shape of the plurality of teeth of the capture ring is that of an isosceles triangle.

9. A kit for joining thermoplastic pipe together comprising:
- a coupling having a body, said body having a coupling first open end, a coupling second open end, and a passageway extending from the coupling first open end to the coupling second open end;
- a mechanical seal at the coupling first open end, wherein the mechanical seal includes a flexible mechanical seal body having a first end and a second end, the mechanical seal body having a tapered portion positioned at the first end of the mechanical seal body, the tapered portion adapted to coact with the first inner tapered surface, the mechanical seal flexible body having an inner surface configured to sealingly receive a first thermoplastic pipe, the tapered portion of the flexible mechanical seal body comprises a radially inward facing tapered surface; and the flexible mechanical seal body further comprises: a substantially cylindrical portion extending from the tapered portion towards the second end of the mechanical seal body; a plurality of sealing rings formed on the radially inward facing tapered surface of the tapered portion of the mechanical seal; and at least one stepped ring positioned further from the first end of the mechanical seal body than the plurality of sealing rings, the stepped ring projecting interiorly from the tapered portion at an angle towards the second end of the mechanical seal body to establish a sealing ledge;
- a nut having a body with threads configured to be threadably received by the pipe conduit;
- a capture ring seated in the conduit first open end and adapted to receive and retain the first pipe end in the coupling first open end during assembly, the capture ring comprising:
  - an inner circumference and an outer circumference to provide the capture ring with an opening to receive the first pipe, a first surface between the inner circumference and the outer circumference, the first surface lying in a first plane, a second surface between the inner circumference and the outer circumference, the second surface lying in a second plane spaced from the first plane, a plurality of prongs each having a sloping face located at a radially inward end of the prong and a slope angle of the sloping face oriented in a circumferential direction, each of the plurality of prongs extending from the inner circumference of the circular body to a first height and sloping toward a lower second height above the first surface of the circular body of the capture ring, wherein the sloping faces of the prongs of the capture ring allow the capture ring to be rotated during rotation of the nut, thereby compressing the mechanical seal;

a plurality of teeth extending from the second surface of the circular body of the capture ring to a second height spaced from the second surface of the circular body, each of the plurality of teeth having a triangular shape and positioned between the inner circumference and an outer circumference of the second surface of the circular body of the capture ring, wherein the teeth of the capture ring engage the nut such that the capture ring rotates with the nut as the nut is being tightened, wherein the plurality of teeth of the capture ring are obliquely angled relative to the second surface of the circular body of the capture ring such that an angular rotation of the nut relative to the capture ring in a first direction produces an engagement between the nut and the plurality of teeth of the capture ring in contrast to an angular rotation of the nut relative to the capture ring in a second direction opposite to the first direction and a fusion seal at the coupling second open end, wherein the fusion seal includes a thermoplastic sleeve having a heating element, the thermoplastic sleeve mounted on an outer surface of a second thermoplastic pipe, wherein the thermoplastic sleeve includes a tapered end adapted to coact with the first inner tapered surface, the sleeve having an inner surface configured to receive an end of the second thermoplastic pipe, and the thermoplastic sleeve and coupling second open end are sized to insert the sleeve in the coupling second open end.

10. The kit of claim 9, wherein the second height spaced apart from the second surface of the circular body of the capture ring occurs at a triangular vertex of at least one of the plurality of triangular-shaped teeth.

11. The kit of claim 9, wherein the triangular shape of the plurality of teeth of the capture ring is that of an isosceles triangle.

* * * * *

UNITED STATES PATENT AND TRADEMARK OFFICE
CERTIFICATE OF CORRECTION

| | | |
|---|---|---|
| PATENT NO. | : 9,611,958 B1 | Page 1 of 1 |
| APPLICATION NO. | : 11/969360 | |
| DATED | : April 4, 2017 | |
| INVENTOR(S) | : Robert V. Carter, Jr., James Stafford and Jeffrey Exley | |

It is certified that error appears in the above-identified patent and that said Letters Patent is hereby corrected as shown below:

In the Specification

Column 3, Line 40, change "thenuoplastic" to --thermoplastic--.

Column 8, Line 59, change "theiinoplastic" to --thermoplastic--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*